Dec. 6, 1960 H. COMLOSSY, JR., ET AL 2,963,304
SWIVEL JOINT FOR EXTREME PRESSURE AND TEMPERATURE RANGES
Filed March 24, 1958

HAROLD COMLOSSY, JR.,
ROBERT R. HEDDEN,
INVENTORS.
WHANN & McMANIGAL
Attorneys for Applicant rical face 19 which receives the inner race 16 and on which the inner race 16 is held, against a shoulder 20, by a nut 21 which screws onto a threaded portion 22 of the inner tubular part B. A lock washer 23 is arranged between the nut 21 and the end of the inner ball race 17, this lock washer 23 being of the vibration resisting type having a key element 24 which projects into a keyway 25 in the inner tubular part B, and which has a portion 26 adapted to be bent over into engagement with a portion of the nut 21 so that the nut cannot be rotated. The outer race ring 18 is fixed within the cylindrical wall 10 by an annular spacer member 27, having a cylindrical wall portion 28 extending from the radial wall 12 to the adjacent end of the outer race 18, and a ring 29 which is threaded into the front end 11 of the cylindrical wall 10 into tight engagement with the outer race ring 18. The ring 29 is held against rotation by a detent 30 formed upon a snap ring 31 which rests in a channel 32 formed externally in the end 11 of the cylindrical wall 10.

2,963,304

SWIVEL JOINT FOR EXTREME PRESSURE AND TEMPERATURE RANGES

Harold Comlossy, Jr., Whittier, and Robert R. Hedden, La Mirada, Calif., assignors to The Youngstown Sheet and Tube Company, Youngstown, Ohio, a corporation of Ohio Filed Mar. 24, 1958, Ser. No. 723,368

2 Claims. (Cl. 285—98)

Our invention relates to swivel connectors for relatively rotatable parts and relates in particular to a swivel joint which will operate for a comparatively long time under conditions of pressure and temperature ranging from extremely low to extremely high, thus providing a swivel connector which is capable of use on equipment which is moved through different areas of the world wherein these extreme conditions are encountered.

It is an object of the invention to provide a swivel connector which is especially suited for use in aircraft which is flown alternately in high temperature and low temperature zones and which under these conditions of operation will satisfactorily conduct fluids at high pressures.

It is a further object of the invention to provide a swivel connector incorporating a sealing means employing an O-ring of composition which will be herein referred to as "rubbery material" for the reason that it has the characteristics of rubber, although it may be artificially produced, this O-ring being used in conjunction with a backup ring which prevents extrusion of the rubbery material of the O-ring, even under extremely high pressures.

Further objects and advantages of the invention will be brought out in the following part of the specification wherein small details are described solely for the purpose of rendering a complete disclosure without intending, however, to limit the scope of the invention which is set forth in the appended claims.

Referring to the accompanying drawings which are for illustrative purposes only:

Figure 1:
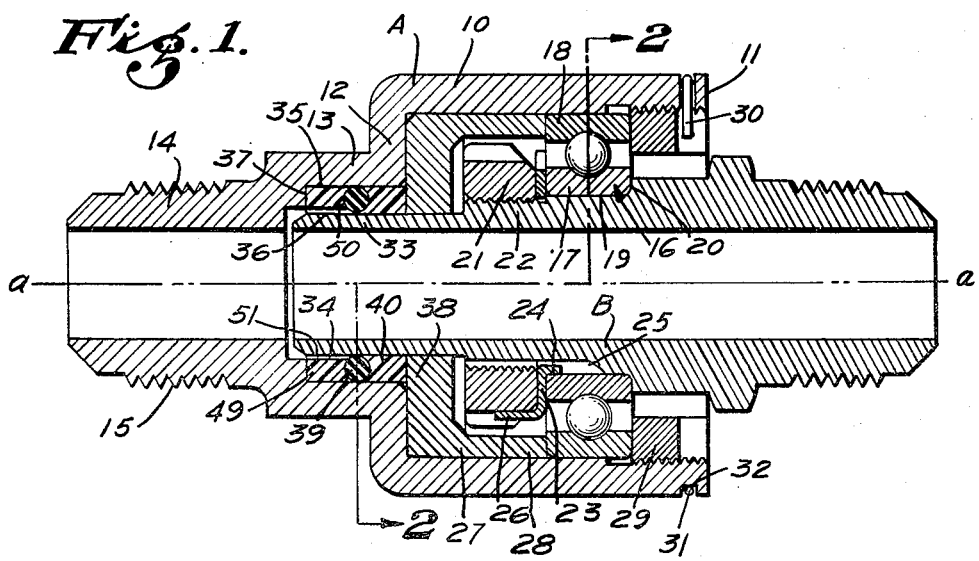
Fig. 1 is a longitudinally sectioned view of a preferred form of the invention.
Figure 2:
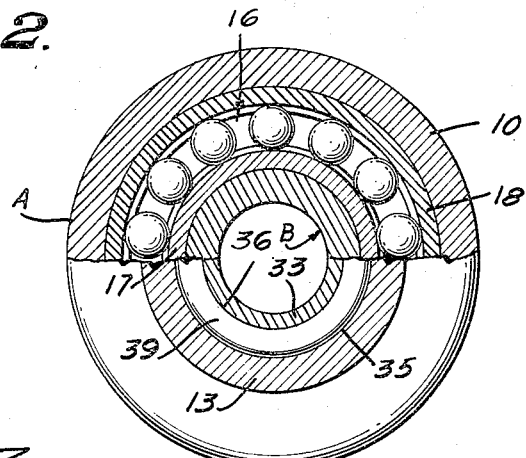
Fig. 2 is a cross-sectional view taken as indicated by the line 2—2 of Fig. 1.

As shown in Figs. 1 and 2, the swivel connector includes an outer tubular part or shell A and an inner tubular part B which extends within the shell A, as shown. The shell A includes a cylindrical wall 10 having an open front end 11 and having a radial wall 12 at the rear end of the cylindrical wall 10. A tubular wall 13 projects outwardly from the radial wall 12, and an extension 14 of the wall 13 is prepared, as by use of threads 15 for connection to some other part, not shown.

The inner tubular part B is supported for relative rotation and limited axial relative movement within the shell A by means including a ball bearing 16 and other parts which will be subsequently described. The ball bearing 16 is of the combined radial and thrust type having an inner race 17 and an outer race 18, there being means for fixing the inner race 17 on the inner tubular part B and for fixing the outer race 18 within the cylindrical wall 10 of the shell A.

The inner tubular part B has an axially aligned cylin-

The inner tubular part B has a cylindrical stem 33 which projects from the threaded portion 22 thereof to a position lying within the tubular wall 13 and in spaced relation thereto so as to form an annular chamber 34. The tubular wall 13 has an inwardly faced cylindrical wall portion 35 and the stem 33 has an outwardly faced cylindrical wall portion 36. The outer end of the chamber 34 is formed by an annular shoulder 37 at the leftward end of the wall 35, and the inner end of the chamber 34 is formed by the radial wall 38 of the spacer 27 which surrounds a portion of the stem 33 and rests against the radial wall 12 of the shell A.

Substantially in the center of the chamber 34 there is an O-ring 39. This term, O-ring, is employed in the mechanical arts to designate a sealing ring of rubber compound which is a volume of generation resulting from the movement of a circle in a circular path around the axis of the ring. Therefore, in cross-section the ring 39 appears as two circular areas. The internal diameter of the ring 39 corresponds to, or may be very slightly smaller than the external diameter of the stem 33, and the external diameter of the ring 39 corresponds to or may be very slightly larger than the diameter of the inwardly faced wall 35.

Figure 3:
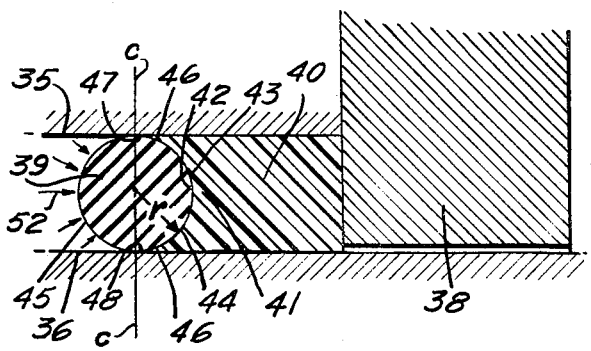
Fig. 3 is an enlarged fragmentary sectional view for illustration of the characteristics of the sealing means of the swivel.

Between the ring 39 and the interior of the shell A there is a backup ring 40 which is tubular in form. As shown in Fig. 3, it has one end 41 in engagement with the side 42 of the O-ring 39, the end 41 having therein an annular channel 43 corresponding in shape to the side 42 of the O-ring 39. The surface defining the channel 43 is a surface of generation resulting from the revolution of an arcuate line 44 around the axis $a$—$a$, Fig. 1, of the O-ring 39. The arcuate line is an arc of a circle having a radius $r$ of the circle 45, Fig. 3, circumscribing the cross-section of the O-ring 39. The angular dimension of the arc 44 is slightly less than 180° so that the sharp lips 46 of the backup ring 40 do not extend to the center line $c$—$c$ which intersects the center of the circle, leaving space for the portions 47 and 48 of the ring 39 to engage the wall surfaces 35 and 36.

As shown in Fig. 1, a facing ring 49 is disposed in the chamber 34 on the side of the O-ring 39 opposite from the backup ring 40. The ring 49 is similar to the ring 40 and has in the end thereof which engages the O-ring 39 a channel 50 conforming to the side of the O-ring 39 which it engages. The ring 49 differs from the ring 40 in the provision of space 51 through which fluid under pressure may flow to the outwardly presented face of the O-ring 39. The backup ring 40, or at least the end thereof which confronts the O-ring 39, is composed of a material having an extremely low coefficient of friction and which is endowed with qualities of plasticity under heat and/or pressure so that the pressure transmitted through the O-ring to the end 41 of the backup ring 40 will expand radially inwardly and outwardly into engagement with the wall surfaces 35 and 36, thereby compensating for wear between the part 40 and the stem 33 which revolves therein. Therefore, the backup ring 40 remains in frictional engagement with the wall surface 36, preventing the formation of an annular space between the wall surface 36 and the contiguous surface of the backup ring 40, into which an annular portion of the O-ring 39 might be extruded because of the heavy fluid pressure applied thereto, as indicated by the arrows 52 in Fig. 3, which fluid pressure may at times exceed 3,000 pounds per square inch.

In the preferred form of the invention the backup ring 40 is of glass filled Teflon which is found to have the characteristics of deformability under heat and/or pressures sufficient to compensate for wear which otherwise would result in the formation of a space into which the rubbery material of the O-ring would be extruded by the heavy fluid pressure applied thereto.

We claim:

1. In a swivel connector for fluid pressure pipes: an outer tubular part; an inner part extending in said outer tubular part; means supporting said parts for relative rotation on a common axis and limited relative axial movement of said parts, said outer part having an inwardly faced tubular wall and said inner part having an outwardly faced tubular wall spaced radially within said outer tubular wall; wall means at the opposite ends of said tubular walls to define with said tubular walls an annular chamber encircling said inner part; an O-ring of rubbery material between and touching said inwardly and outwardly faced walls but not compressed therebetween to any substantial extent; a backup ring for said O-ring disposed between said inwardly and outwardly faced walls and engaged with the wall means at the end of said annular chamber toward which said O-ring is moved by pressure, said backup ring having an annular face in contact with and forming a seat for one side of said O-ring, said annular face having therein an annular channel with a substantially semi-circular cross section corresponding in radius of curvature to the radius of curvature of the cross section of said O-ring with which it is in contact, said semi-circular cross section of said channel having an arc length slightly less than 180°, said backup ring being characterized by having at least the end thereof engaging said O-ring of a coefficient of friction substantially lower than that of the O-ring and being deformable under pressure so that at least the end thereof which engages said O-ring will expand into engagement with said inwardly and outwardly faced walls; and a facing ring substantially filling the space between said inwardly and outwardly faced walls and engaged with the wall means of said annular chamber at the opposite side of said O-ring from said backup ring, said facing ring contacting the other side of said O-ring and having in the face thereof which faces toward and contacts said O-ring an annular channel with a substantially semi-circular cross section corresponding in radius of curvature to the radius of curvature of the cross section of said O-ring to receive an annular portion of said O-ring, the semi-circular cross section of the channel in said facing ring having an arc length slightly less than 180°.

2. In a swivel connector constructed as recited in claim 1 wherein said backup ring has at least the end thereof which engages said O-ring composed of glass filled Teflon.

References Cited in the file of this patent

UNITED STATES PATENTS

| | | |
|---|---|---|
| 2,407,445 | Phillips | Sept. 10, 1946 |
| 2,571,560 | Gall | Oct. 16, 1951 |
| 2,705,177 | Waring | Mar. 29, 1955 |
| 2,815,973 | Jackson | Dec. 10, 1957 |